United States Patent
Christner et al.

(10) Patent No.: US 9,428,923 B1
(45) Date of Patent: Aug. 30, 2016

(54) DOOR AND WINDOW FRAME MEASURING APPARATUS

(71) Applicant: National Warranty & Install Services, LLC, Plano, TX (US)

(72) Inventors: Stephen Christner, Murphy, TX (US); Matthew Christner, Sachse, TX (US); Jason Boor, Sachse, TX (US)

(*) Notice: Subject to any disclaimer, the term of this patent is extended or adjusted under 35 U.S.C. 154(b) by 40 days.

(21) Appl. No.: 14/275,732

(22) Filed: May 12, 2014

(51) Int. Cl.
  *E04F 21/00* (2006.01)
  *G01B 3/08* (2006.01)
  *G01B 5/14* (2006.01)

(52) U.S. Cl.
  CPC ............ *E04F 21/0015* (2013.01); *G01B 3/08* (2013.01); *G01B 5/14* (2013.01)

(58) Field of Classification Search
  CPC ........ E04F 21/0015; G01B 3/08; G01B 5/14
  USPC .................... 33/194, 806, 809, 810, 811, 812
  See application file for complete search history.

(56) References Cited

U.S. PATENT DOCUMENTS

| | | | | |
|---|---|---|---|---|
| 648,576 A * | 5/1900 | Taylor | ................. | G01B 3/08 235/70 R |
| 2,465,778 A * | 3/1949 | Yunger | ................. | A41H 1/02 33/8 |
| 2,473,639 A * | 6/1949 | Erickson | ............ | E04F 21/003 24/11 P |
| 2,603,880 A * | 7/1952 | Dunn | .................. | E04F 21/003 33/194 |
| 3,851,868 A * | 12/1974 | Lagasse | ........... | E04F 21/0007 269/208 |
| 4,930,221 A * | 6/1990 | Taylor | ................. | B27B 27/02 33/197 |
| 5,317,813 A * | 6/1994 | Reed | ................... | G01B 3/08 33/348 |
| 5,566,460 A | 10/1996 | Bates | | |
| 5,775,036 A * | 7/1998 | Stanley, Sr. | ....... | E04F 21/0007 248/354.4 |
| 5,915,810 A * | 6/1999 | Cameron | ............ | G01B 3/08 33/295 |
| 6,282,852 B1 * | 9/2001 | Walcker | ............ | E04F 21/003 144/144.51 |
| 6,769,192 B2 * | 8/2004 | Johansson et al. | ...... | G01B 3/08 33/608 |
| 6,990,741 B1 | 1/2006 | Wells | | |
| 7,069,659 B1 * | 7/2006 | Rye | .................... | E04F 21/003 33/194 |
| 7,204,031 B2 | 4/2007 | Hanson | | |
| 7,240,436 B1 | 7/2007 | Miller et al. | | |
| 2007/0079521 A1 * | 4/2007 | Hill | ...................... | G01B 3/08 33/809 |
| 2015/0040415 A1 * | 2/2015 | Hoebel | ................ | G01B 3/46 33/701 |

FOREIGN PATENT DOCUMENTS

DE             4411609 A1 *  8/1994  ............... G01B 3/08

* cited by examiner

*Primary Examiner* — Christopher Fulton
(74) *Attorney, Agent, or Firm* — Law Office of Sam Sokhansanj PLLC

(57) ABSTRACT

An extendable measuring tool for measuring an alignment of a door or window frame. Specifically, the measuring tool is configured for determining if a door or window frame is out of square by measuring various regions of a frame and comparing the measurements to each other. In aspect of the invention, the tool includes a first carrier member having a channel and a first cap fixed to one end, and a second sliding member having a measuring scale on one surface and a second cap fixed to one end, wherein the second sliding member is at least partially disposed within the channel of the first carrier member and slides therein.

12 Claims, 5 Drawing Sheets

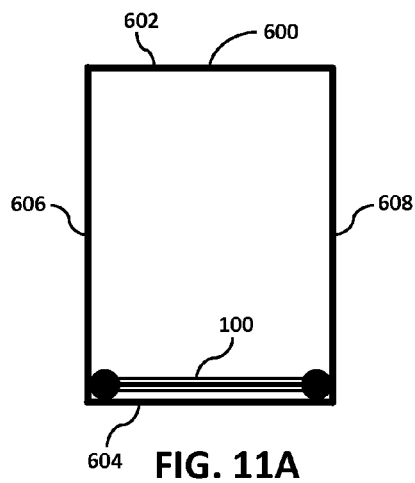
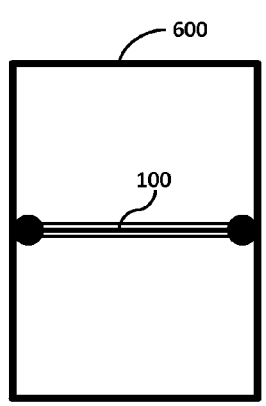
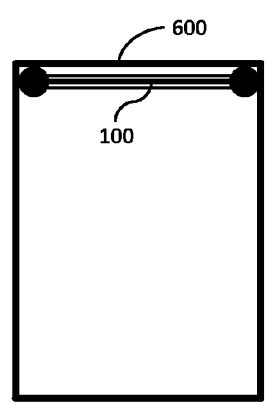
FIG. 11A  FIG. 11B  FIG. 11C
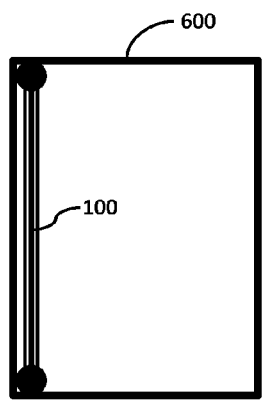
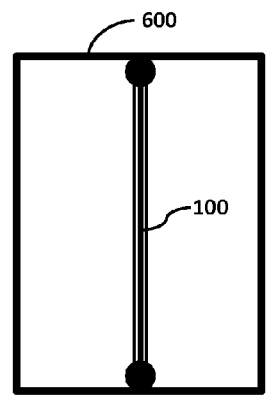
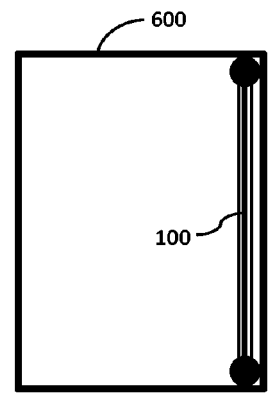
FIG. 11D  FIG. 11E  FIG. 11F
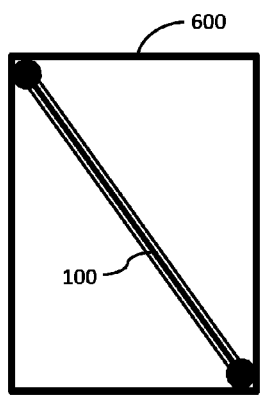
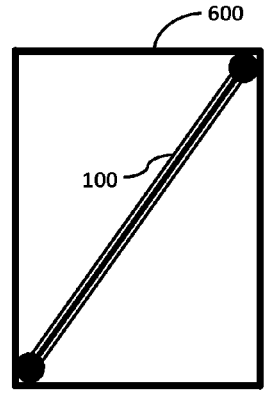
FIG. 11G  FIG. 11H

DOOR AND WINDOW FRAME MEASURING APPARATUS

FIELD OF THE INVENTION

The present invention generally relates to an apparatus for measuring door and window frames.

BACKGROUND OF INVENTION

This section is intended to introduce the reader to aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Prior to installing a door within a door frame, such as a wood or metal door frame, the opening must be entirely square and plumb. Specifically, the vertical and horizontal jambs must all be in the same plane and, further, the vertical jamb portions must be precisely parallel. If the door jambs are out of square (i.e. one corner is not in planar alignment with the others) and/or if the vertical jambs are not precisely parallel, the door will not fit or hang properly. For example, the door can rub or stick against frame or ground or have uneven or unsightly gaps between the door and frame.

Therefore, it is important to initially and properly align the frame, whether it be metal or wood, to provide for ease of installation of the door. In addition, it is important to periodically check the alignment of the frame to determine if the frame has shifted or become out of square due to time, foundation shifting, and environmental conditions. Often, framing is installed or measured by one technician and the doors are subsequently installed or measured by another technician. Currently, the only method of measuring the alignment of door and window frames is to use a standard tape measure. Tape measures inherently are flexible and can sag or bend across their length, which can often times provide inaccurate readings when measuring long distances. Further, there is room for substantial amount of human error to occur that can give to inaccurate readings. For example, one end of the tape measure (proximal end) may not be in contact with one end of the frame/wall and/or the other end (distal end) may not be extended as far or in direct contact with the other end of the frame/wall being measured. Further, due to the inconsistency and non-uniformity of each technician using a tape measure, the door frame measurements tend to be skewed from one measurement taken by one technician from measurements taken by another technician on the same door frame. Hence, the lack of accurate and consistent measurements of a door frame could eventually lead to structural damage to either the frame, door, or both.

Hence, what is needed is an apparatus for measuring door and window frames that can provide consistent and accurate results, is simple to use and operate, heavy duty, and can standardize door frame measuring techniques.

BRIEF SUMMARY OF THE INVENTION

One or more aspects of the present invention overcome the shortfalls of prior attempted methods and devices. In particular, in one aspect of the present invention, a method and apparatus are provided for measuring the alignment of a door or window frame using a slidable distance measuring tool that provides consistent and accurate measurements and wherein the measuring tool is easy for a user to operate, portable and compact, lightweight, heavy duty, cost effective manufacture, and can standardize door frame measuring techniques. Specifically, the measuring tool is configured for determining if a door or window frame is out of square by measuring various regions of a frame and comparing the measurements to each other.

In one aspect of the invention, a measuring apparatus is provided having a first elongated member having a channel and a first cap fixed to one end, a second elongated member having a second cap fixed to one end, wherein the second member is at least partially disposed within the channel of the first member and slides therein, and wherein the measuring apparatus is configured for measuring an alignment of a frame. In addition, the second elongated member can include a measuring scale on one surface. Further, the measuring apparatus further includes a securing mechanism configured to secure the first member with respect to the second member, wherein the securing mechanism can be a rotatable knob. Also, the first and second caps can include one or more projecting tabs and the first and second caps can be round in configuration.

In another aspect of the invention, a measuring apparatus is provided having an elongated first member having in interior and exterior surface, wherein the interior is further comprised of a channel, wherein the first member further comprises a first cap coupled to the exterior surface. The measuring apparatus further includes an elongated second member having a top surface and bottom surface, wherein the top surface includes a measuring guide, wherein the second member further comprises a second cap coupled to one end at the bottom surface, and wherein the second member is at least partially disposed within the channel of the first member and slides therein, and a securing member for securing the first and second member. In addition, the measuring apparatus is adapted for measuring an alignment of a frame.

In another aspect of the invention, a method of measuring a frame is provided, wherein the method can include placing one end of a first slidable member of a measuring tool adjacent to a first wall of a frame, placing one end of a second slidable member of the measuring tool adjacent to a second wall of the frame, and obtaining a measurement from a scale disposed on either the first or second member. Here, the measurement is for determining an alignment of the frame.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 11A-11H illustrate front views of a frame and the measuring apparatus, depicting one or more methods of measuring a frame using the measuring apparatus, according to one or more non-limiting embodiments.

DETAILED DESCRIPTION

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention.

Figure 1:
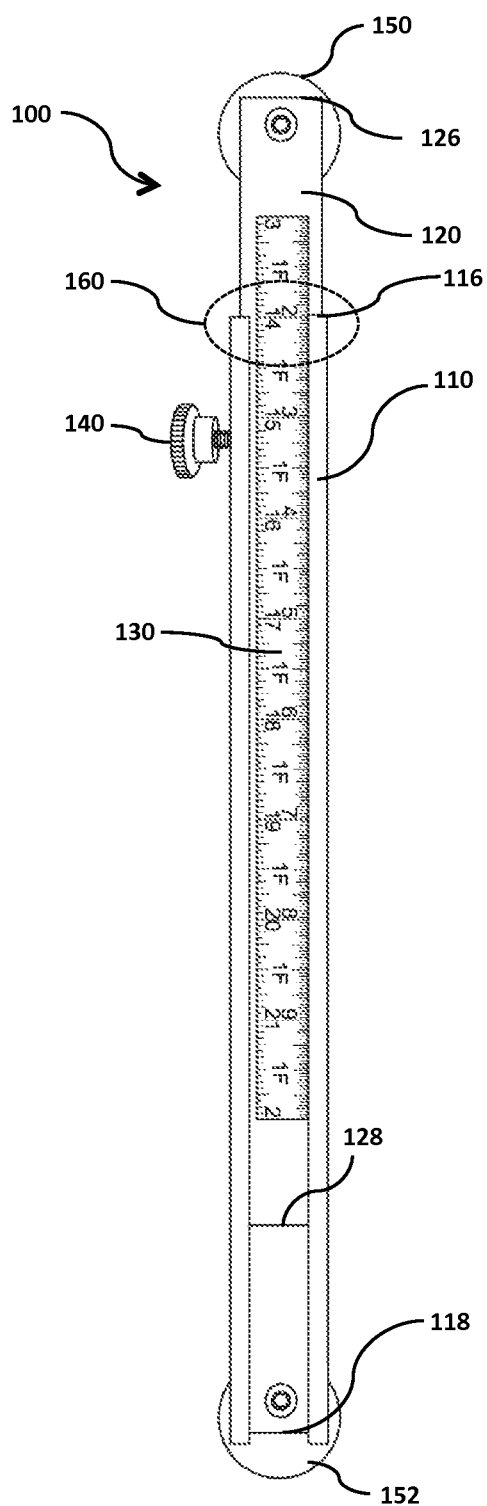
FIG. 1 illustrates an elevated perspective top view of the measuring apparatus according to one non-limiting embodiment.
Figure 2:
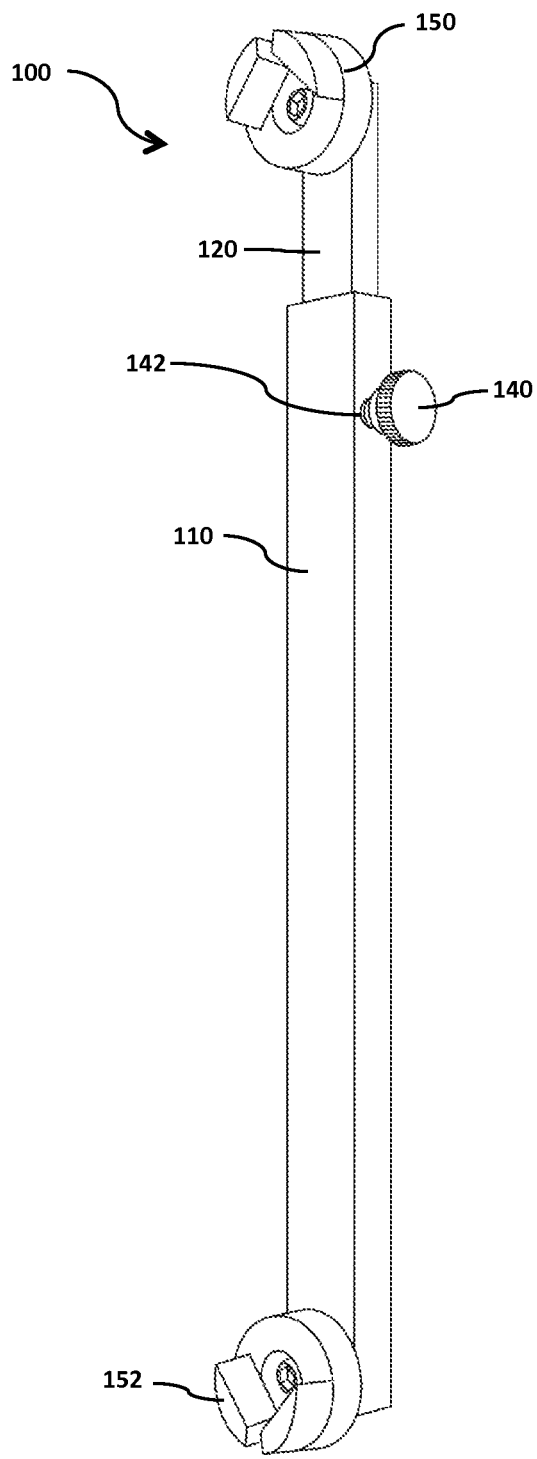
FIG. 2 illustrates an elevated perspective bottom view of the measuring apparatus.

FIG. 1 and FIG. 2 illustrate one embodiment of the measuring apparatus of the present invention. Here, the measuring apparatus can also be referred to herein as squaring device, frame measuring device, sliding measuring device, or alignment measuring device. Specifically, squaring device 100 includes carrier member 110 having an interior channel for insert sliding member 120, wherein sliding insert member 120 slides within carrier 110, which will be described in detail with respect to FIG. 4 and FIG. 5. Carrier member 110 has ends 116 and 118, and sliding member 120 has ends 126 and 128, wherein the length from ends 126 to 128 can match or be equivalent to the lengths from ends 116 to 118. Further, a measuring guide, scale, or ruler 130 is fixed to or printed on the top surface of insert sliding member 120. In some embodiments, measuring guide 130 can be a decal, tape, forged, engraved, or printed distance measuring ruler or scale. Further, the guide, scale, or ruler can be in any type of measurement, including but not limited to inches, feet, meters, millimeters, centimeters, and the like. In addition, it is contemplated within the scope of the invention that carrier member 110 can also include a measuring guide, ruler or scale on its outer or inner surface.

Device 100 further includes a securing mechanism such as a rotating screw knob 140 that can lock member 120 within carrier 110, wherein carrier 110 includes a threaded aperture 142 for receiving threaded screw knob 140. For example, once a user has achieved a desired measurement at area 160 by sliding member 120 within carrier 110, the user can then hold that position by rotating knob 140 in a clock-wise direction until member 120 is locked or stopped in place. Here, screw knob 140 can be rotated until it makes secure contact with member 120 within carrier 110, thereby pressing an exterior side wall surface of member 110 against the interior walls of carrier 120 and securing it therein. In contrast, by rotating knob 140 in a counter clock-wise direction, member 120 can be released from carrier 110 and move or slide freely within carrier 120. It is contemplated within the scope of the invention that any type of securing, locking, or stopping member can be used in lieu of or in addition to knob 140, including but not limited biasing device, spring tensioner, clamp, or clasp, among others.

Figure 3:
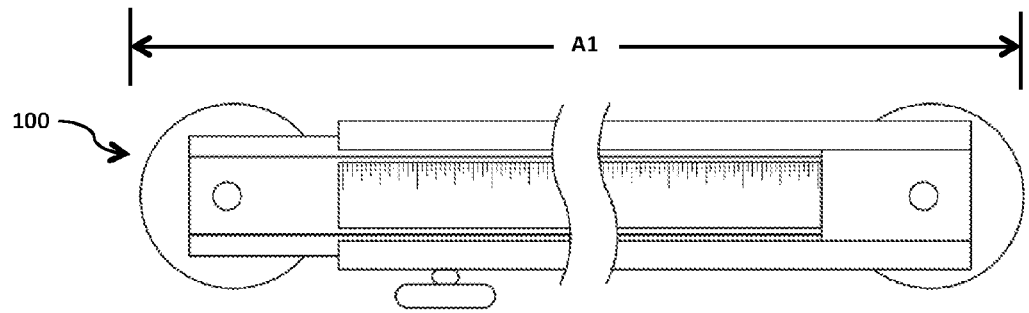
FIG. 3 illustrates a top view of the measuring apparatus, illustrating various lengths for the apparatus.

Still referring to FIG. 1, squaring device 100 further includes end caps 150 and 152 fixed to member 120 and carrier 110, respectively. Here, once the end caps 150 and 152 are placed adjacent to a frame being measured, a user can take the measurement of the distance by looking at the area denoted by area 160 on scale 130, wherein the lip or end 116 of carrier 110 meets or aligns with slide member 120. FIG. 3 illustrates that device 100 can have a length A1 anywhere from 13 inches up to and including 144 inches. For example, in a fully collapsed (un-extended) state, device 100 can have a predetermined length X1, and in a fully extended state have a length X2 double or twice its collapsed length. In one embodiment, device 100 can have an un-extended end-to-end length of approximately 13 inches and a fully extended end-to-end length up to approximately 22 inches. In another embodiment, device 100 can have an un-extended end-to-end length of approximately 22 inches and fully extended end-to-end length up to approximately 40 inches. In another embodiment, device 100 can have an un-extended end-to-end length of approximately 40 inches and fully extended end-to-end length up to approximately 76 inches. In another embodiment, device 100 can have an un-extended end-to-end length of approximately 76 inches and fully extended end-to-end length up to approximately 144 inches.

Figures 4, 5:
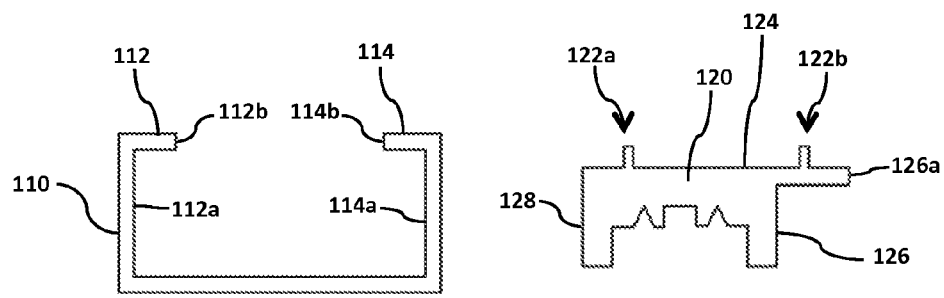
FIG. 4 illustrates a cross-sectional view of a carrier member of the measuring apparatus, according to one-non limiting embodiment.
FIG. 5 illustrates a cross-sectional view of the sliding insert member of the measuring apparatus, according to one non-limiting embodiment.

FIG. 4 illustrates an embodiment of the channel carrier member 110 and FIG. 5 illustrates an embodiment of the sliding member 120. Here, carrier 110 has an elongated channel with flanges or lips 112 and 114 for securing sliding member 120 therein. Specifically, a side wall 128 of member 120 abuts and is adjacent to side wall 112a wherein an elongated projection 122a and 122b (i.e. runs the length of member 120) abuts and is adjacent to the outer surfaces 112b and 114b, respectively. Further, side wall 126a abuts and is adjacent to the outer surface of wall 114a. In addition, offset wall 126 allows for sufficient open space for tightening screw knob 140 to engage the outer surface of wall 126, thereby securing member 120 to carrier 110 and preventing the two parts from sliding with respect to each other.

Figures 6A, 6B, 6C:
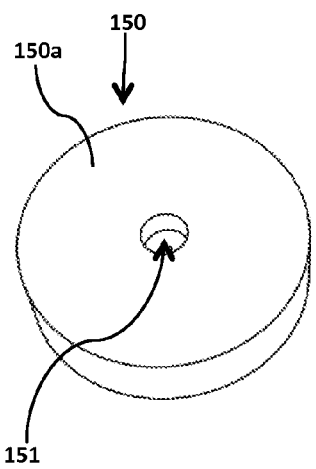
FIG. 6A illustrates an elevated top perspective view of an end cap of the measuring apparatus, according to one non-limiting embodiment.
FIG. 6B illustrates an elevated bottom perspective view of the end cap of the measuring apparatus.
FIG. 6C illustrates an elevated side perspective view of the end cap of the measuring apparatus.
Figure 9:
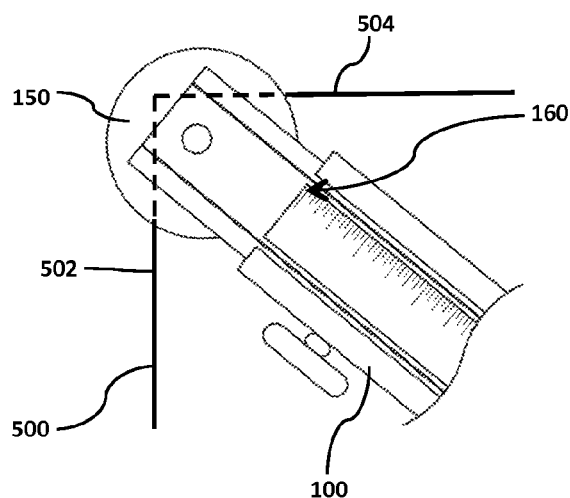
FIG. 9 illustrates a front view of the end cap of the measuring apparatus placed outside of a frame or square-like component for measurement, according to one non-limiting embodiment.
Figure 10A:
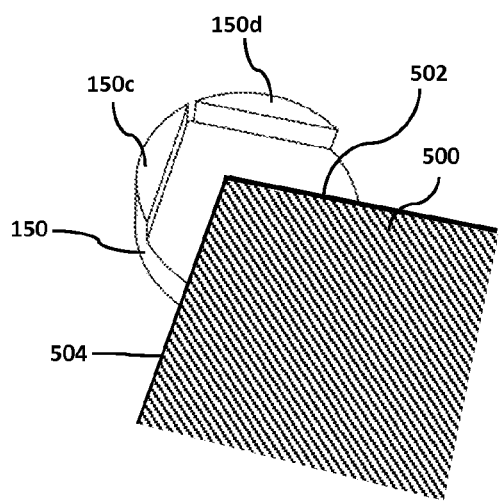
FIG. 10A illustrates a perspective bottom view of the end cap being placed outside of the frame or square-like corner component for measurement, according to one non-limiting embodiment.
Figure 10B:
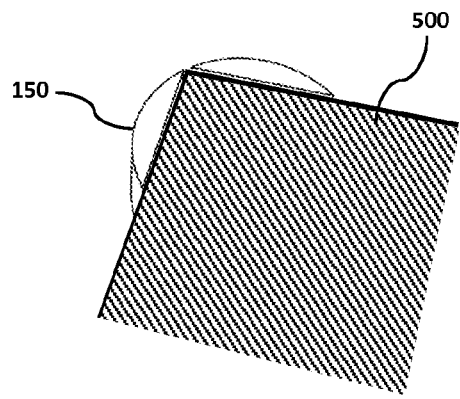
FIG. 10B illustrates an elevated perspective bottom view of the end cap placed outside and adjacent to the frame or square-like corner component for measurement, according to one non-limiting embodiment.

FIG. 6A-6C illustrate various views for end cap 150, wherein end cap 152 is duplicate thereof. Specifically, end cap 150 can be anywhere from 0.25 inch diameter up to and including a 4 inch diameter, preferably 1.25 inches. Here, bottom surface 150a is fixed (via a screw fastener) to sliding member 120 at or near end 126 at aperture 151, wherein aperture 151 is preferably approximately 0.25 inches from end 126. Similarly, the bottom surface of cap 152 is fixed (via a screw fastener) to carrier member 110 at or near end 118, preferably its center aperture being approximately 0.25 inches from end 118. Cap 150 also includes a pair of projecting tabs 150c and 150d on its top interior surface 150b. Here, projections 150c and 150d can securely help position device 100 when the device is placed over the outer edges of a frame or square-like corner of a piece being measured, which is described in more detail with respect to FIGS. 9-10B. In addition, end cap 150 can have a thickness B1 ranging from 0.05 inches up to 2 inches, preferably 0.75 inches. Tabs 150c and 150d can each have a thickness B2 ranging from 0.05 inches up to 2 inches, preferably 0.50 inches.

Figure 7:
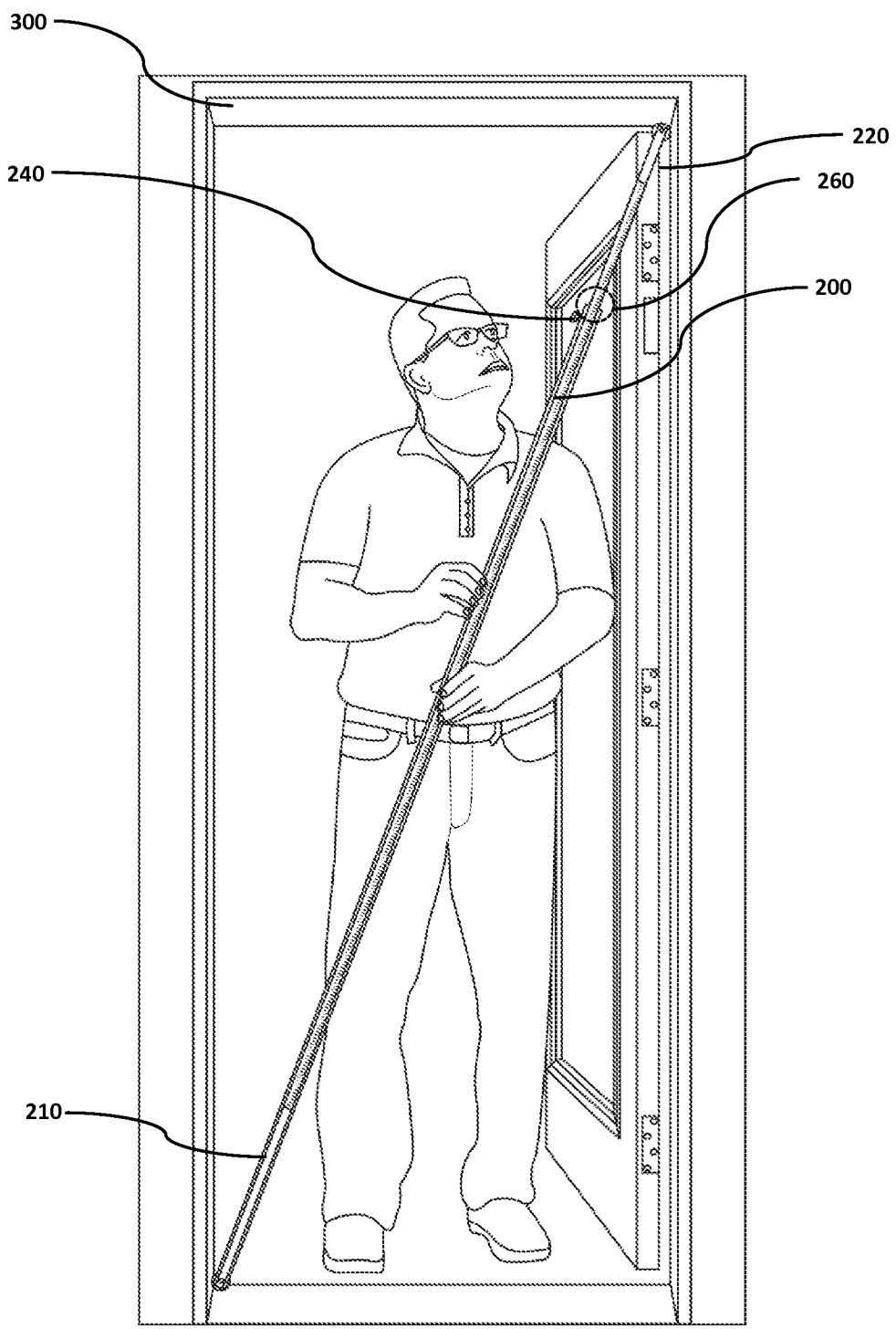
FIG. 7 illustrates a front view of a user using the measuring apparatus in a door frame, according to one non-limiting embodiment.
Figure 8:
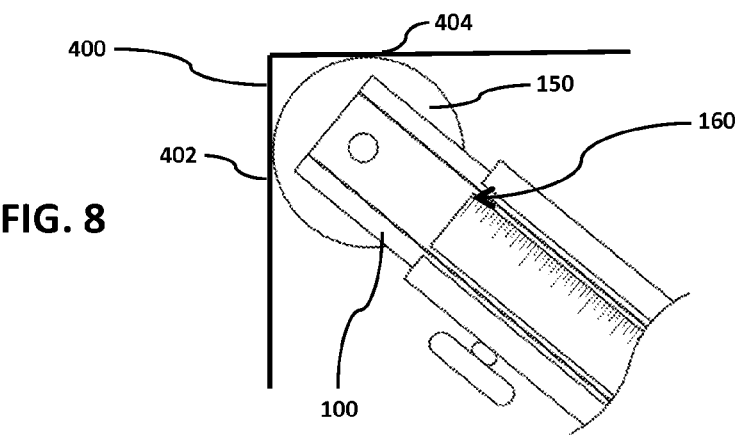
FIG. 8 illustrates a front view of the end cap of the measuring apparatus placed within and adjacent to a head jamb and side jamb of a frame for measurement, according to one non-limiting embodiment.

FIG. 7 illustrates a method of measuring the alignment of a door frame 300 using a squaring device 200 of the present invention. In this embodiment, a user takes cross diagonal measurements of a door frame 300 using squaring device 100 having a length of approximately 76 inches which can be extend up to 144 inches. Specifically, a user can position an end of the carrier member 210 of device 100 against a bottom corner of a side door jamb and door sill with one hand, and with another hand extend a sliding member 220 of the device 100 against a top corner of a side door jamb and top door jamb. Once both ends of device 100 are in full contact with the door jambs or walls, then the user can lock the position in place by rotating knob 240 in a clockwise direction until member 220 can no longer slide within carrier member 210. Here, the user can now visually observe the measurement on a scale disposed on the sliding member 220 at area 260 (similar to area 160 of FIG. 1). Similarly, the user can repeat the process for taking the diagonal cross measurements on the other corners of the door frame 300 in order to determine if frame 300 is out of square or out of alignment. In addition, the user can take any other type of height or width measurements with device 100 or device 200 within a door or window frame, which will be described in further detail with respect to FIGS. 11A-11H.

FIGS. 8-10B illustrate another method of measuring a square or out square frame. Here, end cap 150 is shown being placed against a corner of frame 400. Here, the exterior outer surface of cap 150 can come into direct contact with walls 404 and 402 by extending either the carrier member 110 or sliding member 120. Similarly, end cap 152 can be placed against an opposing corner of frame 400 and in direction contacts with the opposing corner's walls (not shown). Once the end caps 150 and 152 of device 100 are in full contact with the opposing corners of frame 400, the user can visually read the measurement at area 160. Similarly, at FIG. 9 and FIGS. 10A and 10B, the user can take the measurement of frame 500 by placing end caps 150 and 152 over the outer corner edges of frame 500. Specifically, tabs 150c and 150d will come abut against and be adjacent to outer side walls 504 and 502, respectively. Once end caps 150 and 152 are placed over the opposing corners of frame 500, the user can visually read the measurement at area 160.

FIGS. 11A-11H illustrate one or more methods of measuring a door or window frame 600 using the squaring device 100 of the present invention in order to determine if a frame, door frame, or window frame is in alignment, out of alignment, square, or out of square. Specifically, frame 600 can have top side wall 602, opposing bottom side wall 604, left side wall 606, and opposing right side wall 608. Here, any of the aforementioned walls 602-608 can also be referred to herein as door jambs or door sills. FIG. 11A illustrates obtaining a bottom width measurement of frame 600. Here, a user can extend device 100 until the opposing end caps are in direct contact with or adjacent to walls 606 and 608 that can also be in direct contact with or adjacent to wall 604, and the user can record the measurement for the bottom region width of frame 600. FIG. 11B illustrates obtaining a middle width measurement of frame 600. Here, a user can extend device 100 until the opposing end caps are in direct contact with or adjacent to walls 606 and 608 and record the measurement for the middle width region of frame 600.

FIG. 11C illustrates obtaining a top width measurement of frame 600. Here, a user can extend device 100 until the opposing end caps are in direct contact with or adjacent to walls 606 and 608 that can also be in direct contact with or adjacent to wall 602, and record the measurement for the top width region of frame 600. FIG. 11D illustrates obtaining a far left height measurement of frame 600. Here, a user can extend device 100 until the opposing end caps are in direct contact with or adjacent to walls 602 and 604 that can also be in direct contact with or adjacent to wall 606, and record the measurement for the left height region of frame 600.

FIG. 11E illustrates obtaining a middle height measurement of frame 600. Here, a user can extend device 100 until the opposing end caps are in direct contact with or adjacent to walls 602 and 604 and record the measurement for the middle height region of frame 600. FIG. 11F illustrates obtaining a far right height measurement of frame 600. Here, a user can extend device 100 until the opposing end caps are in direct contact with or adjacent to walls 602 and 604 that can also be in direct contact with or adjacent to wall 608, and record the measurement for the right height region of frame 600.

FIG. 11G illustrates obtaining a diagonal (top left corner to bottom right corner) length measurement of frame 600. Here, a user can extend device 100 until one of the end caps are in direct contact with or adjacent to either or both of walls 602 and 606, and an opposing end cap is in direct contact with either or both of walls 604 and 608, and the user can record the measurement for the first diagonal measurement of frame 600. FIG. 11H illustrates obtaining a diagonal (top right corner to bottom left corner) length measurement of frame 600. Here, a user can extend device 100 until one of the end caps are in direct contact with or adjacent to either or both of walls 602 and 608, and an opposing end cap is in direct contact with or adjacent to either or both of walls 604 and 606, and the user can record the measurement for the second diagonal measurement of frame 600. Once one or more of the measurements are obtained form the one or more methods depicted from FIGS. 11A-11H, a user can then compare and compute the measurements to determine if the frame is in alignment, out of alignment, in square, out of square.

It is contemplated within the scope of the invention, that any one or more components of the squaring device of the present invention, such as the sliding member and carrier member, can be made of any materials, including but not limited to: stainless steel, metallic, nickel, iron, metal, aluminum, titanium, copper, gold, silver, brass, alloy, fiberglass, plastic, polymer, polycarbonate based, polyvinyl based, polyvinyl chloride, carbon, organic or inorganic materials, and the like.

From the foregoing it will be seen that this invention is one well adapted to attain all ends and objectives hereinabove set forth, together with the other advantages which are obvious and which are inherent to the invention.

Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

What is claimed is:

1. A measuring apparatus comprising:
  a first elongated member having a channel and a first disc coupled to a first end;
  a second elongated member having a second disc coupled to a second end, wherein the second end opposes the first end;
  the first disc at least partially extending beyond the first end;
  the second disc at least partially extending beyond the second end;
  the first disc and the second disc each having a first protrusion and a second protrusion, wherein the first protrusion is perpendicular with respect to the second protrusion;
  the second elongated member at least partially disposed within the channel of the first elongated member and configured to slide therein; and
  wherein the measuring apparatus is configured to measure an alignment of a frame.

2. The measuring apparatus of claim 1, wherein the second elongated member further comprises a measuring scale on one surface.

3. The measuring apparatus of claim 1, wherein the measuring apparatus further comprises a securing mechanism configured to secure the first member with respect to the second member.

4. The measuring apparatus of claim 3, wherein the securing mechanism is comprised of a rotatable knob.

5. The measuring apparatus of claim 1, wherein the first and second discs are round in configuration.

6. A measuring apparatus comprising:
  an elongated first member having an interior and exterior surface, wherein the interior surface comprises a channel, and wherein the first member further comprises a first plate coupled to the exterior surface;
  an elongated second member having a top surface and a bottom surface, wherein the second member further comprises a second plate coupled to one end of the bottom surface, and wherein the second member is at least partially disposed within the channel of the first member and configured to slide therein;
  the first and second plate each having a protruding first and second tab, wherein the first tab is substantially perpendicular with respect to the second tab;
  a securing member for securing the first and second member; and
  a measuring guide disposed on either the first member or the second member.

7. A method of measuring a frame, the method comprising:
  placing a first end of a first slidable member of a measuring tool adjacent to a first wall of a frame, the first end comprised of a first plate having at least two protrusions perpendicular to each other;
  placing a second end of a second slidable member of the measuring tool adjacent to a second wall of the frame, the second end comprised of a second plate having at least two protrusions perpendicular to each other; and
  obtaining a measurement from a scale disposed on either the first slidable member or the second slidable member, wherein the measurement is for determining an alignment of the frame.

8. The method of claim 7, wherein the frame is further comprised of a door frame.

9. The method of claim 7, wherein the frame is further comprised of a window frame.

10. The method of claim 7, wherein the measurement is further comprised of one or more diagonal measurements from the first wall to the second wall of the frame.

11. The method of claim 10, wherein the measurement is further comprised of one or more width measurements from the first wall to the second wall of the frame.

12. The method of claim 11, wherein the measurement is further comprised of one or more height measurements from a third wall to a fourth wall of the frame.

* * * * *